United States Patent

Spakowski et al.

[11] Patent Number: 5,282,645
[45] Date of Patent: Feb. 1, 1994

[54] ELECTRO-HYDRAULIC PRESSURE REGULATING VALVE ASSEMBLY MOUNTED IN A VALVE BOSS ON A HYDRAULIC DAMPER

[75] Inventors: Joseph G. Spakowski, Macedon; David A. Webb, Rochester; Christopher B. Coolican, Walworth, all of N.Y.

[73] Assignee: General Motors Corporation, Detroit, Mich.

[21] Appl. No.: 981,452

[22] Filed: Nov. 25, 1992

[51] Int. Cl.⁵ ............................................. B60G 11/26
[52] U.S. Cl. .................. 280/707; 280/714; 188/299; 251/30.02; 137/854
[58] Field of Search ............... 280/707, 714; 188/299; 251/30.01, 30.02, 30.05, 46, 129.16; 137/854

[56] References Cited

U.S. PATENT DOCUMENTS

| | | | |
|---|---|---|---|
| 4,572,436 | 2/1986 | Stettner et al. | 239/585 |
| 4,749,069 | 6/1988 | Knecht et al. | 188/299 |
| 4,785,920 | 11/1988 | Knecht et al. | 188/299 |
| 4,802,561 | 2/1989 | Knecht et al. | 188/318 |
| 4,832,162 | 5/1989 | Bacardit | 188/299 |
| 4,880,086 | 11/1989 | Knetch et al. | 188/299 |
| 4,902,034 | 2/1990 | Maguran et al. | 280/707 |
| 4,960,188 | 10/1990 | Wössner | 188/299 |
| 4,988,967 | 1/1991 | Miller et al. | 335/279 |
| 5,024,460 | 6/1991 | Hanson et al. | 280/707 |
| 5,163,538 | 11/1992 | Derr et al. | 188/299 X |
| 5,163,706 | 11/1992 | Maguran, Jr. et al. | 188/299 X |

OTHER PUBLICATIONS

Research Disclosure 2244 (1990) Feb. No. 310 NY, US 31079–Ride Control Actuator.

Primary Examiner—D. Glenn Dayoan
Assistant Examiner—Boris Milef
Attorney, Agent, or Firm—A. Michael Tucker

[57] ABSTRACT

An electro-hydraulic valve assembly includes a center pole mounting an electric solenoid assembly and slidably received in a valve boss. The solenoid assembly controls the fluid pressure in a chamber defined in the center pole. Fluid in the chamber is biased against a deflectable disc which controls fluid flow through the valve assembly. Control of electric current to the solenoid assembly controls fluid pressure in the chamber and, thus, fluid flow through the valve assembly. When utilized with a damper and a controller, the present valve assembly provides continuously variable damping in real time.

17 Claims, 3 Drawing Sheets

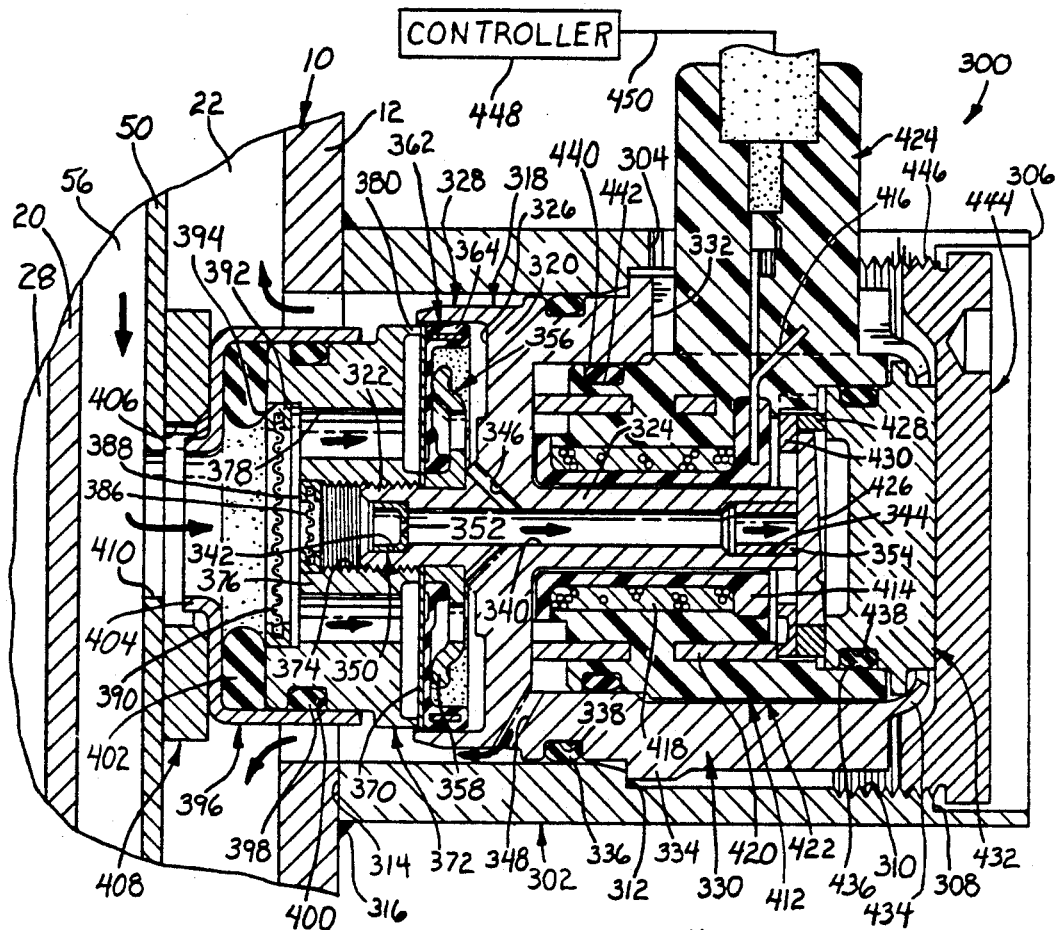
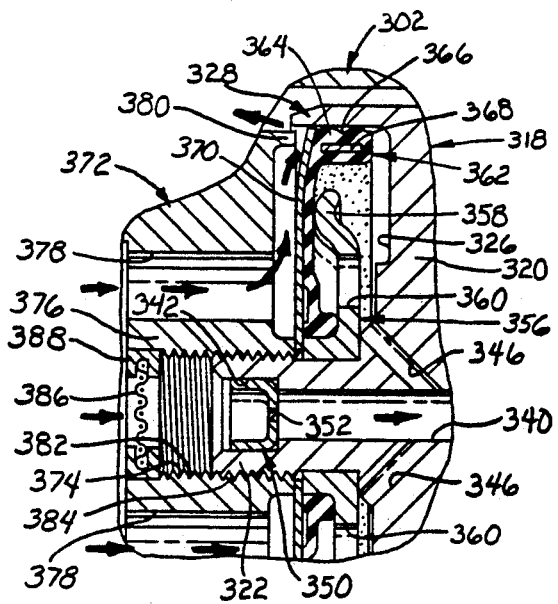
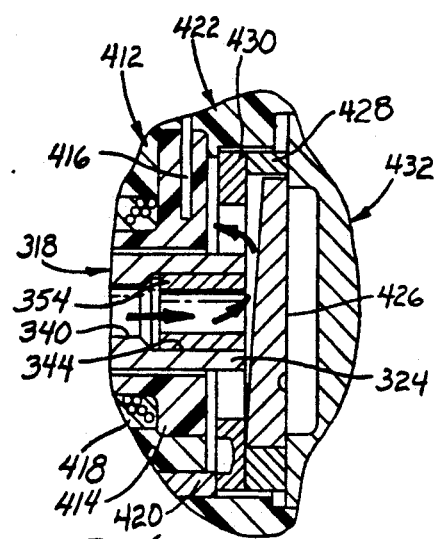
Fig. 4
Fig. 5
Fig. 6

ELECTRO-HYDRAULIC PRESSURE REGULATING VALVE ASSEMBLY MOUNTED IN A VALVE BOSS ON A HYDRAULIC DAMPER

BACKGROUND OF THE INVENTION

1. Field of the Invention

The present invention relates generally to an electrically controlled hydraulic damper for a vehicular suspension system. In particular, the present invention is concerned with an electro-hydraulic pressure regulating valve assembly mounted in a valve boss on a damper for continuously varying a damping force in real time for semi-active ride control.

2. Description of the Related Art

Electrically controlled hydraulic dampers (shock absorbers and struts) for vehicular suspension systems are well-known. Many controllable shock absorbers utilize an electric solenoid or motor-driven member to select different damping characteristics. Due to small electric actuators and the high friction of the movable members, many known controllable dampers are limited in response time, and are not suitable for real time systems. A particular damping setting, once selected, cannot be changed quickly enough to respond to the next individual suspension movement. In addition, many devices select from a limited group of discrete settings and are not capable of providing continuously variable damping.

The art continues to seek improvements. It is desirable to provide a continuously variable damper capable of real time response.

SUMMARY OF THE INVENTION

The present invention includes an electro-hydraulic pressure regulating valve assembly, particularly suited for use with a hydraulic damper. The valve assembly permits a damper to provide continuously variable damping in real time through a computer controller. Fluid pressure in the valve assembly is proportional to electric current supplied to a solenoid coil. Each electrical signal inputted to the valve assembly produces a specific pressure output independent of fluid flow to the valve assembly. An armature in the valve assembly shifts in response to varying fluid flow to maintain the output pressure. The present, compact valve assembly is suitable for mass production and use on passenger and commercial vehicles.

In a preferred embodiment, the present valve assembly includes a center pole mounting an electric solenoid assembly and slidably received in a valve boss. The solenoid assembly controls the fluid pressure in a chamber defined in the center pole. Fluid in the chamber is biased against a deflectable disc which controls fluid flow through the valve assembly. Control of electric current to the solenoid assembly controls fluid pressure in the chamber and, thus, fluid flow through the valve assembly. When utilized with a damper and a controller, the present valve assembly provides continuously variable damping in real time.

BRIEF DESCRIPTION OF THE DRAWINGS

FIG. 4 is an enlarged longitudinal sectional view of a second embodiment of an electro-hydraulic pressure regulating valve assembly according to the present invention mounted on the damper of FIG. 1 in place of the first embodiment of the present valve assembly.

FIG. 5 is an enlarged partial view of the valve assembly of FIG. 4 illustrating deflection of a flexible disc and seal.

FIG. 6 is an enlarged partial view of the valve assembly of FIG. 4 illustrating a tapered armature unseated from a hardened insert.

DETAILED DESCRIPTION OF THE PREFERRED EMBODIMENTS

Figure 1:
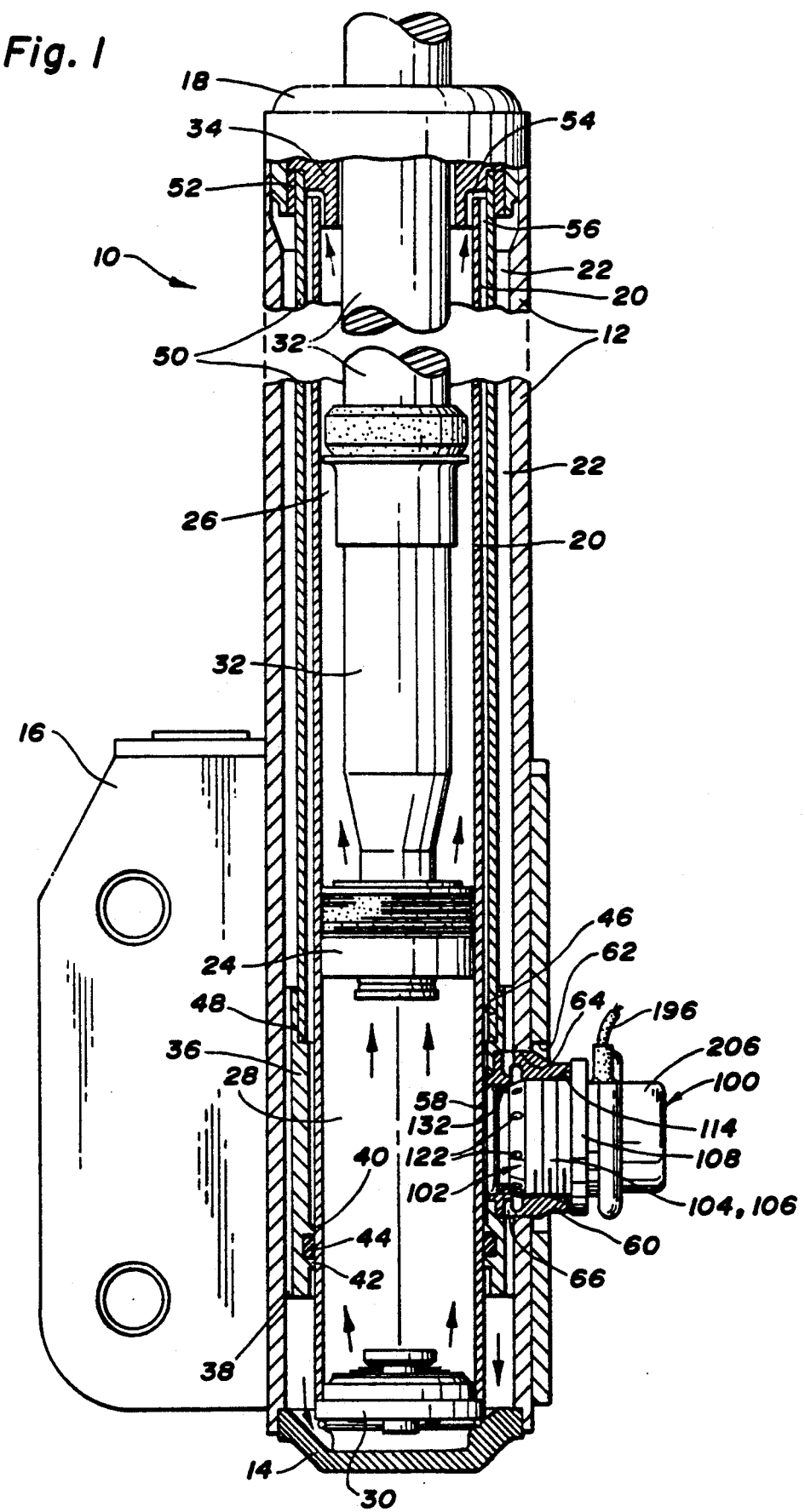
FIG. 1 is a longitudinal sectional view of a hydraulic damper having a first embodiment of an electro-hydraulic pressure regulating valve assembly according to the present invention.

A hydraulic damper is indicated generally at 10 in FIG. 1. The damper 10 includes an outer reservoir tube 12 closed at its lower end by an end cap 14. A bracket 16 is provided about a lower portion of the reservoir tube 12 for securing the damper 10 to a vehicular road wheel assembly (not illustrated) in a well-known manner. A seal cover 18 is welded or otherwise secured to the upper end of the reservoir tube 12.

A fluid-filled inner cylinder 20 is spaced inwardly from and concentric with the reservoir tube 12. The interior volume between the inner cylinder 20 and the reservoir tube 12 forms a fluid reservoir 22. A piston 24 is slidably mounted inside the inner cylinder 20 and divides the interior volume of the inner cylinder 20 into an upper chamber 26 and a lower chamber 28. The piston 24 includes internal valving (not illustrated) which permits one-way flow from the lower chamber 28 to the upper chamber 26 as the piston 24 reciprocates in the inner cylinder 20. A compression valve assembly 30 secured to the lower end of the inner cylinder 20 controls the one-way flow of fluid from the reservoir 22 into the lower chamber 28 during operation of the damper 10 as described below.

A piston rod 32 is attached at its inner end to the piston 24 and is connected at its upper end (not shown) to bodywork of a vehicle in any conventional manner. The piston rod 32 passes through a rod guide 34 mounted at the upper end of the inner cylinder 20 and held in position by the seal cover 18. An annular elastomeric seal (not illustrated) is seated on the rod guide 34 and has sealing contact with the piston rod 32 to prevent loss of hydraulic fluid from the upper chamber 26 as the piston 24 strokes in the inner cylinder 20 during operations.

A tubular sleeve insert 36 is fitted between the inner cylinder 20 and the reservoir tube 12 near the lower end of the inner cylinder 20. The sleeve insert 36 includes a plurality of radially, spaced-apart ribs 38 on its outer surface which produce an interference fit against the reservoir tube 12. A pair of annular flanges 40,42 provided on the inner surface of the sleeve insert 36 support a sealing ring 44 which provides a fluid seal against the inner cylinder 20.

An undercut 46 in the upper end of the sleeve insert 36 forms an annular seat 48 for receiving a lower end of an intermediate tube 50 concentrically mounted between the inner cylinder 20 and the reservoir tube 12. The upper end of the intermediate tube 50 is mounted on the rod guide 34. If desired, an annular spacer 52 can be provided between the intermediate tube 50 and the seal cover 18. An annular fluid port 54 is provided in the rod guide 34 to permit fluid to pass from the upper chamber 26 to a bypass channel 56 formed in the annular space between the inner cylinder 20 and the intermediate tube 50. The bypass channel 56 is in fluid communication with an annular fluid receiving chamber 58 formed between the inner cylinder 20 and the sleeve insert 36.

A tubular adapter 60 having internal threads is received in complementary openings 62,64 in the bracket 16 and the reservoir tube 12 and is sealingly secured to the sleeve insert 36 by any suitable means. A plurality of radial channels 66 are provided in the adapter 60 which are in fluid communication with the reservoir 22. As described below, a continuously variable electro-hydraulic pressure regulating valve assembly indicated generally at 100 is threaded to the adapter 60. The valve assembly 100 changes the damping force provided by the damper 10 by permitting fluid to flow from the bypass channel 56 to the reservoir 22 as described below.

Figure 2:
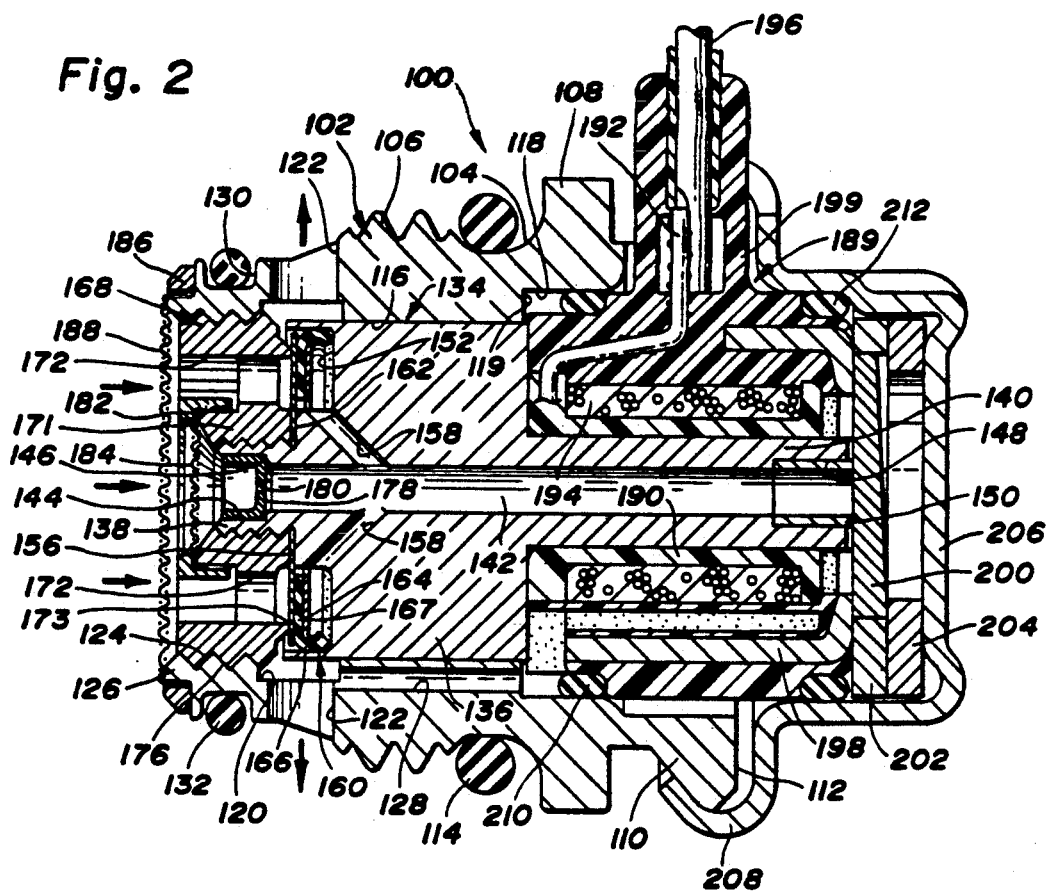
FIG. 2 is an enlarged longitudinal sectional view of the pressure regulating valve assembly of FIG. 1 removed from the damper.
Figure 3:
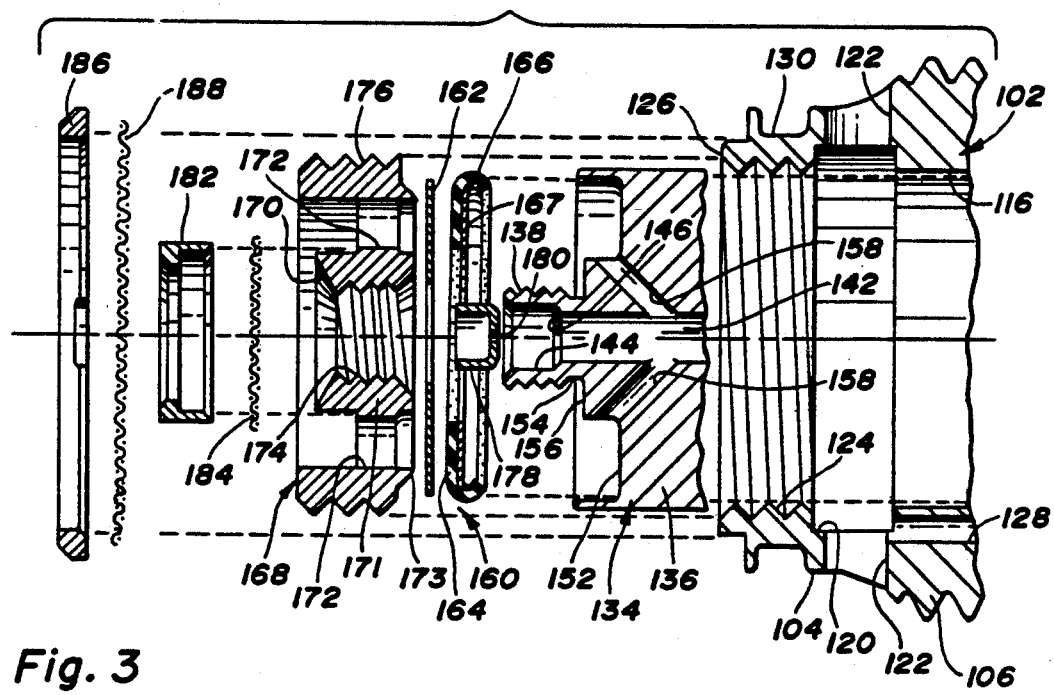
FIG. 3 is an exploded sectional view of a portion of the valve assembly of FIG. 2.

The valve assembly 100, illustrated best in FIGS. 2 and 3, includes a generally tubular valve body 102 having an outer wall 104 threaded at its central portion 106. The threaded portion 106 of the outer wall 104 is received by the internal threads of the adapter 60 as described above. The outer wall 104 has a pair of axially spaced annular flanges 108,110 formed between the threaded portion 106 and an outer end 112 of the valve body 102. A seal ring 114 is positioned around the outer wall 104 axially inwardly from the flange 108 to prevent escape of fluid across the threaded connection between the adapter 60 and the valve body 102.

The interior of the valve body 102 includes a small diameter cylindrical wall 116 and a large diameter cylindrical wall 118. An annular seat 119 is formed at the intersection of the walls 116,118. An undercut 120 is formed in the small diameter cylindrical wall 116 which intersects a plurality of radially spaced ports 122 passing through the outer wall 104. An internally threaded portion 124 is provided in the small diameter cylindrical wall 116 between the undercut 120 and an inner end 126 of the valve body 102. A small diameter return channel 128 is provided in the valve body 102 radially outbound of the small diameter cylindrical wall 116 between the seat 119 and the undercut 120. If desired, flow restrictors (not illustrated) can be mounted in the return channel 128. A groove 130 is formed in the outer wall 104 between the ports 122 and the inner end 126 of the valve body 102. A seal ring 132 is retained in the groove 130 and provides a fluid seal against the adapter 60.

A center pole 134 has a central body 136, a short extension 138 projecting from one end of the body 136, and a long extension 140 projecting from the opposite end of the body 136. The outer diameter of the body 136 is complementary to and received in the small diameter cylindrical wall 116 of the valve body 102. A pilot pressure chamber 142 is formed as a longitudinal channel along the axis of the center pole 134. An internal cavity 144 having a diameter greater than the pilot pressure chamber 142 is formed in the short extension 138 and connected to the pilot pressure chamber 142 by an annular shoulder 146. An internal cavity 148 having a diameter greater than the pilot pressure chamber 142 is formed in the long extension 140. A tubular, hardened insert 150 is press-fitted into the cavity 148 and preferably protrudes slightly beyond the long extension 140.

An annular depression 152 is formed in an end of the body 136 which encircles the short extension 138. An undercut 154 is formed in the outer circumference of the short extension 138 adjacent the body 136 to form an annular seat 156. Preferably, the remainder of the outer circumference of the short extension 138 is threaded as illustrated in the FIGS. 2 and 3. A plurality of angled spur channels 158 provide fluid communication between the pilot pressure chamber 142 and the depression 152.

A disc and seal assembly 160 includes a flexible disc 162 and a reinforced seal 164. Preferably, the seal 164 is affixed to the disc 162 by any suitable means, including an adhesive. The disc 162 is flexible in response to axial fluid motion described below. The seal 164 is a cup-shaped rubber element having an annular, curved flange 166 and preferably reinforced with a stainless steel mesh 167. As described below, the flange 166 forms a dynamic face seal against the periphery of an inner wall of the depression 152 as the disc 162 deflects.

The disc and seal assembly 160 is received over the short extension 138 through respective openings so that the disc 162 rests on the seat 156. The flange 166 of the seal 164 is fitted into the depression 152 and the disc 162 is fitted within the inner cylindrical wall of the depression 152.

A valve nut 168 retains the disc and seal assembly 160 on the center pole 134. The valve nut 168 is a cylindrical element having a central opening 170 in a hub 171 and a plurality of fluid ports 172 surrounding the hub 171. An annular, raised seat 173 is provided on a surface of the valve nut 168 facing the disc and seal assembly 160 radially outbound of the ports 172. Internal threads 174 are provided on an inner cylindrical wall of the central opening 170 and external threads 176 are provided about the circumference of the valve nut 168. The internal threads 174 are mated with the external threads of the short extension 138. Simultaneously, external threads 176 are mated with the internal threads 124 of the small diameter cylindrical wall 116 of the valve body 102. When the valve nut 168 is threaded onto the short extension 138, the disc 162 rests against the seat 173 to inhibit fluid flow through the ports 172 as the seal and disc assembly 160 is clamped between the seat 156 and the valve nut 168.

A cup-shaped restrictor 178 is press fitted into the cavity 144 provided in the short extension 138. The restrictor 178 includes a small diameter opening or pilot orifice 180 to permit fluid to pass into the pilot pressure chamber 142 as described below.

A small cylindrical retainer 182 is press-fitted over the hub 171 of the valve nut to secure a low flow filter 184. A large cylindrical retainer 186 is press-fitted over the inner end 126 of the valve body 102 to secure a high flow filter 188. The high flow filter 188 screens fluid entering the ports 172 and the opening 170 of the hub 171, while the low flow filter 184 screens only fluid entering the opening 170. The filters 184,188 can be formed from any suitable material, including phosphor-bronze screen.

An electric solenoid assembly 189 is mounted on the long extension 140 of the center pole 134 and is received in the large diameter cylindrical wall 118 of the valve body 102. The solenoid assembly 189 includes a tubular bobbin 190 having an axial opening for receiving the long extension 140. Terminal pins 192 (only one of which is illustrated in FIG. 2) are pressed into the bobbin 190 prior to the winding of a coil 194 on the bobbin 190. Lead wires 196 are crimped to the terminal pins 192 and extend to an electric controller (not illustrated). A cup-shaped ring pole 198 is inserted over the bobbin 190 and coil 194. A non-conductive encapulant 199 is provided about the coil 194 and ring pole 198 and the wires 196 to a position beyond the valve body 102. A hinged or tapered armature 200 is positioned within a non-magnetic ring spacer 202 so that the hinged armature 200 rests on an outer end of the hardened insert 150. An armature plate 204 is captured between the ring spacer 202 and an end cap 206 and limits the range of movement of the tapered armature 200 as described below. The very small range of travel between the hinged armature 200 and the armature plate 204 provides real time pressure change in the pilot pressure chamber 142 in response to electrical signals to the coil 194. A flange 208 on the end cap 206 is crimped onto the outer flange 110 of the valve body 102 to retain the solenoid assembly 189. A pair of seal rings 210,212 are provided about the solenoid assembly 189 to prevent fluid leaks from the valve body 102. The structure and operation of a similar solenoid-actuated tapered armature is fully described in U.S. Pat. No. 4,572,436 assigned to the assignee of this invention.

In operation, the piston 24 and piston rod 32 reciprocate inside the inner cylinder 20 in a well-known manner. Fluid in the upper chamber 26 is directed by ports 54 to the annular bypass channel 56 and receiving chamber 58. At this point, fluid at a supply pressure passes through filters 188,184 and enters the electro-hydraulic pressure regulating valve assembly 100 described above.

The majority of fluid (the main flow) that enters the valve assembly 100 passes through the ports 172 of the valve nut 168 and deflects the disc 162 away from the valve nut 168. The seal 164 prevents fluid leakage around the perimeter of the deflected disc 162. When the disc 162 is deflected, fluid passes through the ports 122 in the valve body 102 and the radial channels 66 of the adapter 60 to enter the reservoir 22. From the reservoir 22, fluid returns to the lower chamber 28 through the compression valve assembly 30 in a well-known manner.

The solenoid assembly 189 is used to control fluid pressure in the pilot pressure chamber 142 and, therefore, the deflection of the disc 162 and fluid flow past it. A small amount of fluid (the pilot flow) entering the valve assembly 100 passes through the pilot orifice 180 in the restrictor 178 to reach the pilot pressure chamber 142. This pilot flow remains substantially constant into the pilot pressure chamber 142. When the solenoid assembly 189 is not energized, pressure in the chamber 142 reaches a sufficient level to cause the tapered armature 200 to be unseated from the hardened insert 150. Fluid flows from the interior of the end cap 206 to the return channel 128 to ports 122 and channels 66 to return to the reservoir 22.

When the solenoid assembly 189 is energized, the tapered armature 200 is pulled toward the hardened insert 150, restricting pilot flow from exiting through the insert 150 and increasing pressure in the chamber 142. Increased fluid pressure in the chamber 142 and spur channels 158 resists the deflection of the disc 162 as fluid presses against the cup-shaped seal 164, resulting in an increase in fluid pressure in the damper 10. In this manner, the amount of electrical current applied to the solenoid assembly 189 can continuously vary the damping of the damper 10.

A damper 10 according to the present invention can be installed at each wheel assembly of a vehicle. An electronic controller can receive various inputs from accelerometers and position sensors along with vehicle speed, brake status and steering position. A control algorithm determines an optimal damping force and energizes the respective solenoid assemblies 189 to change the fluid pressures in the dampers. Each corner can be independently changed to provide a desired damping.

A second embodiment of the present continuously variable electro-hydraulic pressure regulating valve assembly is indicated generally at 300 in FIG. 4. Valve assembly 300 functions similarly to valve assembly 100 to change the damping force of damper 10 by permitting fluid to flow from the bypass channel 56 to the reservoir 22. However, valve assembly 300 does not require a separately formed valve body (like valve body 102) to contain the fluid control elements. Instead, the control elements are mounted in a valve boss 302 mounted on the reservoir tube 12.

The valve boss 302 is a tubular member having a cutout 304 provided adjacent its outer end 306. An annular recess 308 is formed at the outer end 306 and threads 310 are formed in the inner diameter adjacent the recess 308. Preferably, an annular seat 312 is provided in the inner diameter at about the mid-length of the valve boss 302. An inner end 314 of valve boss 302 is mounted on the reservoir tube 12 by any suitable means, including welding indicated at 316.

The valve assembly 300 includes a center pole 318 having a central body 320 from which a short extension 322 and a long extension 324 project in opposite directions. An annular depression 326 is formed in the central body 320 around the short extension 322 and bounded by a first annular wall 328. A second annular wall 330 is formed around the long extension 324 and extends toward the outer end 306 of the valve boss 302. A cutout 332 is provided in the second annular wall 330 and aligned with the cutout 304 of the valve boss 302. An outer annular flange 334 formed in the second annular wall 330 rests on seat 312 when the center pole 318 is slid into the valve boss 302 as described below. A seal ring 336 is fitted into a groove 338 in the second annular wall 330 to provide a fluid seal between the valve boss 302 and the center pole 318.

A pilot pressure chamber 340 is formed as a longitudinal channel along the axis of the center pole 318. An internal cavity 342 having a diameter greater than the pilot pressure chamber 340 is formed in the short extension 322. An internal cavity 344 having a diameter greater than the pilot pressure chamber is formed in the long extension 324. A plurality of angled spur channels 346 provide fluid communication between the pilot pressure chamber 340 and the depression 326. At least one exit channel 348 with a discharge point inbound of the seal ring 336 is provided through the second annular wall 330.

A cup-shaped restrictor 350 is fitted into the cavity 342 provided in the short extension 322. The restrictor 350 includes a small diameter opening or pilot orifice 352 to permit fluid to pass into the pilot pressure chamber 340 as described below. A tubular, hardened insert 354 is fitted into the cavity 344 formed in the long extension 324.

A spacer 356 is slid over the short extension 322. The spacer 356 includes an annular flange 358 projecting inwardly and preferably includes a plurality of ports 360.

A seal 362 is a cup-shaped elastomeric element fitted over the short extension 322 and positioned against the spacer 356. The seal 362 includes an annular wall 364 engaging an inner surface of the first annular wall 328 to provide a dynamic face seal. Preferably, a pattern of indentations 366 is provided on the outer surface of the wall 364 to enhance the seal at the first annular wall 328. Also, it is preferable that an annular band 368 be provided in the wall 364 for reinforcement.

A disc 370 is a flexible valve member fitted over the short extension 322 and positioned against the seal 362. The disc 370 and seal 362 deflect at their outer portions in response to fluid pressure and flow as illustrated in FIG. 5. The flange 358 of the spacer 356 acts as a disc stop and limits the range of deflection. At all positions of the seal 362, a fluid seal is maintained against the first annular wall 328 by wall 364.

A valve nut 372 retains the disc 370, seal 362 and spacer 356 on the center pole 318. The valve nut 372 is a cylindrical element having a central opening 374 in a hub 376 and a plurality of fluid ports 378 surrounding the hub 376. An annular seat 380 is provided on the valve nut 372 on a surface facing the disc 370 radially outbound of the ports 378. Internal threads 382 are provided about the central opening 374 which mate with external threads 384 on the short extension 322.

A low flow filter 386 is mounted in a retainer 388 and fitted into the central opening 374. A high flow filter 390 is mounted in a retainer 392 and fitted into a recess 394 formed in the valve nut 372 radially outbound of the ports 378. The high flow filter 390 screens fluid entering the ports 378 and the central opening 374, while the low flow filter 386 screens only fluid entering the central opening 374.

A hollow, cylindrical seal cup 396 is fitted over the outer circumference of the valve nut 372. A seal ring 398 is fitted into a groove 400 in the outer circumference of the valve nut 372 to provide a fluid seal between the seal cup 396 and the valve nut 372. An annular elastomeric isolator 402 is provided between the valve nut 372 and the seal cup 396. A protruding inlet portion 404 of the seal cup 396 is urged into an opening 406 in a sleeve insert 408 fitted on the intermediate tube 50. An opening 410 in the intermediate tube 50 provides fluid communication between the bypass chamber 56 and the valve assembly 300 via the seal cup 396.

An electric solenoid assembly 412 is mounted on the long extension 324 of the center pole 318 and is received within the second annular wall 330. The solenoid assembly 412 includes a tubular bobbin 414 having an axial opening for receiving the long extension 324. Terminal pins 416 (only one of which is illustrated in FIGS. 4 and 6) are pressed into the bobbin 414 prior to the winding of a coil 418 on the bobbin 414. A cylindrical ring pole 420 is inserted over the bobbin 414 and coil 418. A non-conductive encapulant 422 is provided about the coil 418 and ring pole 420 and pins 416 to form a connector receiver 424. A hinged or tapered armature 426 is positioned within a non-magnetic ring spacer 428 and positioned on a ring seat 430 so that the armature 426 rests on an outer end of the hardened insert 354. A retainer 432 is secured adjacent the ring spacer 428 by a crimped or rolled annular flange 434 of the second annular wall 330. A seal ring 436 is fitted into a groove 438 on the retainer 432 to provide a fluid seal between the retainer 432 and the encapulant 422. A seal ring 440 is fitted into a groove 442 in the outer circumference of the encapulant 422 to provide a fluid seal between the encapulant 422 and the second annular wall 330.

To assemble the valve assembly 300 prior to insertion into the valve boss 302, the spacer 356, seal 362 and disc 370 are retained by the valve nut 372 on the short extension 322. The seal cup 396 is pressed onto the outer surface of the valve nut 372. The solenoid assembly 412 is fitted over the long extension 324 and retained by the crimped flange 434 as described above. This valve assembly 300 is then slid into the valve boss 302 so that the inlet portion 404 of the seal cup 396 is received in opening 406 of the sleeve insert 408 and the connector receiver 424 is positioned in the cutout 304 of the valve boss 302. A cover 444 having external threads 446 is mated to threads 310 of the valve boss 302 to seat the annular flange 334 and seal cup 396 as the assembly 300 is urged toward the damper 10. The isolator 402 is compressed as the assembly 300 is urged into the seal cup 396.

In operation, valve assembly 300 operates in a manner similar to valve assembly 100. The majority of fluid entering the valve assembly 300 passes through the ports 378 of the valve nut 372 and deflects the disc 370 away from the annular seat 380 as illustrated in FIG. 5. The seal 362 prevents fluid leakage around the perimeter of the deflected disc 370 into the depression 326. Fluid passes the disc 370 and enters the reservoir 22 of the damper 10.

The solenoid assembly 412 is used to control fluid pressure in the pilot pressure chamber 340 and therefore, the deflection of the disc 370. A magnetic-hydraulic force balance is formed as the armature 426 is forced away from the hardened insert 354 by fluid flow in the pilot pressure chamber 340 as illustrated in FIG. 6. Energization of the coil 418 draws the armature 426 toward the insert 354, thereby increasing the pressure in the pilot pressure chamber 340, and thus increasing the resistance the deflection of the disc 370. Fluid passes the armature 426 and travels to the reservoir 22 via exit channels 348. A controller 448 connected to the solenoid assembly 412 by a wire 450 with a suitable connector selectively energizes the coil 418.

The deflection of the disc 370 can also be altered by varying its thickness, material, etc. Furthermore, the diameter of the disc 370 (and seal 362 and spacer 356) can be altered as desired between a maximum of approximately the inner diameter of the valve boss 302 and a minimum slightly greater that the diameter of the short extension 322. It is understood corresponding changes in the valve nut 372 and center pole 318 are required to accommodate such changes in the disc 370.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. An electro-hydraulic pressure regulating valve assembly comprising:
   (a) a center pole having a central body from which short and long extensions project in opposite directions, a first annular wall encircling the short extension, a second annular wall encircling the long extension, and a fluid chamber formed therethrough;

(b) a valve nut, having port means, secured to the short extension;

(c) a flexible disc mounted between the valve nut and the center pole for controlling the flow of fluid through the port means, wherein the disc is in fluid communication with the fluid chamber so that pressure in the fluid chamber opposes the deflection of the disc; and (d) a solenoid valve assembly, secured to the long extension, for controlling fluid pressure in the fluid chamber.

2. The valve assembly specified in claim 1 including a seal cup mounted on the valve nut.

3. The valve assembly specified in claim 2 including an elastomeric isolator between the seal cup and the valve nut.

4. The valve assembly specified in claim 1 wherein the valve nut includes an annular seat for the disc.

5. The valve assembly specified in claim 1 including a seal mounted between disc and the central body.

6. The valve assembly specified in claim 5 including a spacer mounted between the seal and the central body.

7. The valve assembly specified in claim 1 wherein an annular flange on the second annular wall is crimped to retain the solenoid valve assembly.

8. The valve assembly specified in claim 1 wherein the second annular wall includes at least one fluid exit channel.

9. A hydraulic damper for a suspension system comprising:

(a) a reservoir tube;

(b) a fluid-filled inner cylinder concentrically mounted in the reservoir tube;

(c) a fluid reservoir formed in the interior volume between the inner cylinder and the reservoir tube;

(d) a piston, reciprocally mounted in the inner cylinder, secured to a piston rod extending through an upper end of the inner cylinder and dividing the interior of the inner cylinder into upper and lower chambers;

(e) piston valve means for controlling the flow of fluid from the lower chamber to the upper chamber as the piston reciprocates;

(f) compression valve means for controlling the flow of fluid from the reservoir to the lower chamber as the piston reciprocates;

(g) bypass channel means for receiving fluid from the upper chamber as the piston reciprocates;

(h) a valve boss mounted on the reservoir tube so that an interior volume is in fluid communication with the reservoir; and (i) valve means slidably received in the valve boss for controlling the flow of fluid from the bypass channel means to the reservoir including (i) a pressure control fluid chamber for receiving fluid from the bypass channel means formed in a center pole having long and short extensions extending in opposite directions, the center pole including a first annular wall encircling the short extension and a second annular wall encircling the long extension;

(ii) solenoid means for controlling fluid pressure in the pressure control chamber mounted on the long extension; and (iii) deflectable disc means for directing fluid entering the valve means to the reservoir dependent upon fluid pressure in the pressure control chamber.

10. The damper specified in claim 9 wherein the valve means includes a valve nut having ports secured to the short extension for retaining the disc means on the center pole.

11. The damper specified in claim 10 including a seal cup mounted on the valve nut having an inlet port in fluid communication with the bypass channel means.

12. The damper specified in claim 10 wherein the valve means includes a seat for the disc means.

13. The damper specified in claim 9 wherein the second annular wall includes a flange crimped to retain the solenoid means.

14. A continuously variable real time damper comprising:

(a) a fluid-filled cylinder;

(b) a piston reciprocally mounted in the cylinder dividing the interior of the inner cylinder into upper and lower chambers and including valving to permit fluid flow from the lower chamber to the upper chamber;

(c) a reservoir tube concentrically mounting the cylinder;

(d) an intermediate tube concentrically mounted between the cylinder and the reservoir tube;

(e) an annular bypass channel formed between the intermediate tube and the cylinder;

(f) a reservoir formed between the intermediate tube and the reservoir tube;

(g) means for directing fluid from the upper chamber to the bypass channel;

(h) means for directing fluid from the reservoir to the lower chamber;

(i) a valve boss mounted on the reservoir tube in fluid communication with the reservoir; and (j) pressure regulating valve means slidably received in the valve boss including (i) a fluid chamber receiving a pilot flow of fluid from the bypass channel formed in a center pole having short and long extensions extending in opposite directions, the center pole including a first annular wall encircling the short extension and a second annular wall encircling the long extension;

(ii) electric solenoid means for controlling fluid pressure in the fluid chamber mounted on the long extension;

(iii) port means for directing fluid entering the valve means to the reservoir; and (iv) deflectable disc means in fluid communication with the fluid chamber for controlling the flow through the port means.

15. The damper specified in claim 14 wherein the pressure regulating valve means includes a valve nut having ports secured to the short extension for retaining the disc means on the center pole.

16. The damper specified in claim 15 including a seal cup mounted on the valve nut having an inlet port in fluid communication with the bypass channel means.

17. The damper specified in claim 14 wherein the second annular wall includes a flange crimped to retain the solenoid means.

* * * * *